(12) United States Patent
Ströker

(10) Patent No.: US 7,777,786 B2
(45) Date of Patent: Aug. 17, 2010

(54) METHOD FOR CALCULATING COLOR CORRECTION

(75) Inventor: Dirk Ströker, Warendorf (DE)

(73) Assignee: Olympus Soft Imaging Solutions GmbH, Münster (DE)

( * ) Notice: Subject to any disclaimer, the term of this patent is extended or adjusted under 35 U.S.C. 154(b) by 259 days.

(21) Appl. No.: 11/635,711

(22) Filed: Dec. 7, 2006

(65) Prior Publication Data

US 2007/0126894 A1 Jun. 7, 2007

(30) Foreign Application Priority Data

Dec. 7, 2005 (DE) .................. 10 2005 058 415

(51) Int. Cl.
*H04N 5/228* (2006.01)
(52) U.S. Cl. .................. 348/222.1; 348/242; 348/266; 348/272
(58) Field of Classification Search .................. None
See application file for complete search history.

(56) References Cited

U.S. PATENT DOCUMENTS

| | | | |
|---|---|---|---|
| 6,195,456 B1 * | 2/2001 | Balasubramanian et al. | 382/167 |
| 6,850,272 B1 * | 2/2005 | Terashita | 348/223.1 |
| 6,888,568 B1 * | 5/2005 | Neter | 348/222.1 |
| 6,961,064 B2 | 11/2005 | Bushey | |
| 2001/0013894 A1 * | 8/2001 | Parulski et al. | 348/207 |

FOREIGN PATENT DOCUMENTS

| | | |
|---|---|---|
| DE | 102 23 751 A1 | 1/2003 |
| WO | WO 2005/032147 A1 | 4/2005 |

* cited by examiner

*Primary Examiner*—Sinh Tran
*Assistant Examiner*—Paul Berardesca
(74) *Attorney, Agent, or Firm*—Collard & Roe, P.C.

(57) ABSTRACT

A device and a method for color data correction during color data transmission from a pickup device to an output device. Raw data of the pickup device are converted to uncorrected interim color values with a smaller number of pixels than the pickup device, and the uncorrected interim color values are then subjected to a color correction calculation and are finally converted into corrected interim color values for the output device.

6 Claims, 8 Drawing Sheets

Fig. 1

| | 1 | 2 | 3 | 4 | 5 | 6 | 7 | 8 | 9 | 10 |
|---|---|---|---|---|---|---|---|---|---|---|
| 1 | R | $G_1$ | R | $G_1$ | R | $G_1$ | R | $G_1$ | R | $G_1$ |
| 2 | $G_2$ | B | $G_2$ | B | $G_2$ | B | $G_2$ | B | $G_2$ | B |
| 3 | R | $G_1$ | R | $G_1$ | R | $G_1$ | R | $G_1$ | R | $G_1$ |
| 4 | $G_2$ | B | $G_2$ | B | $G_2$ | B | $G_2$ | B | $G_2$ | B |
| 5 | R | $G_1$ | R | $G_1$ | R | $G_1$ | R | $G_1$ | R | $G_1$ |
| 6 | $G_2$ | B | $G_2$ | B | $G_2$ | B | $G_2$ | B | $G_2$ | B |
| 7 | R | $G_1$ | R | $G_1$ | R | $G_1$ | R | $G_1$ | R | $G_1$ |
| 8 | $G_2$ | B | $G_2$ | B | $G_2$ | B | $G_2$ | B | $G_2$ | B |
| 9 | R | $G_1$ | R | $G_1$ | R | $G_1$ | R | $G_1$ | R | $G_1$ |
| 10 | $G_2$ | B | $G_2$ | B | $G_2$ | B | $G_2$ | B | $G_2$ | B |

1

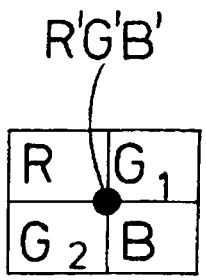
_Fig.2_
_Fig.3_

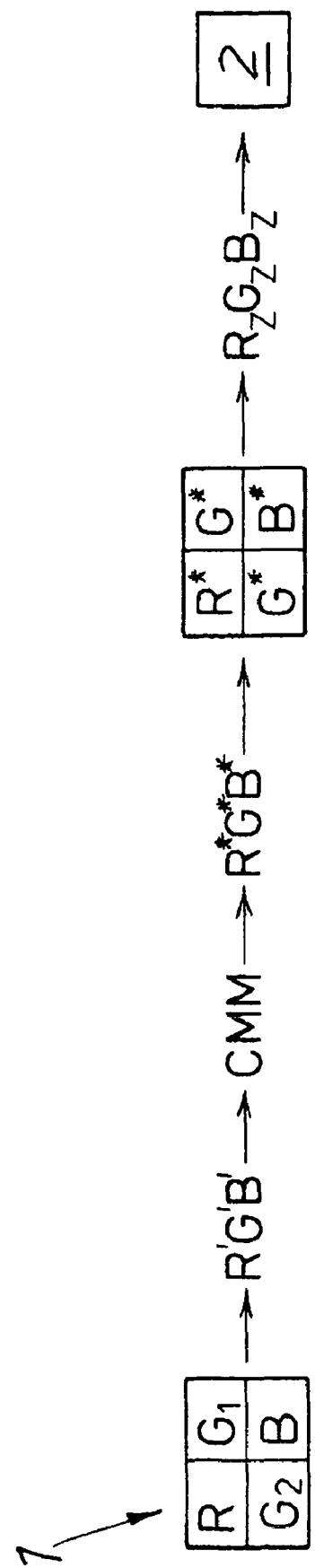

|   | 1 | 2 | 3 | 4 |
|---|---|---|---|---|
| 1 | $R_1^*$ | $G_1^*$ | $3R_2^*$ | $G_1^*$ |
| 2 | $G_2^*$ | $B^*$ | $G_2^*$ | $B^*$ |
| 3 | $3R_3^*$ | $G_1^*$ | $9R_4^*$ | $G_1^*$ |
| 4 | $G_2^*$ | $B^*$ | $G_2^*$ | $B^*$ |

|   | 1 | 2 | 3 | 4 |
|---|---|---|---|---|
| 1 | $R^*$ | $G_1^*$ | $R^*$ | $G_1^*$ |
| 2 | $G_2^*$ | $B_1^*$ | $G_2^*$ | $B_2^*$ |
| 3 | $R^*$ | $G_1^*$ | $R^*$ | $G_1^*$ |
| 4 | $G_2^*$ | $B_3^*$ | $G_2^*$ | $B_4^*$ |

$B_Z$

METHOD FOR CALCULATING COLOR CORRECTION

CROSS-REFERENCE TO RELATED APPLICATIONS

This application claims priority to German Patent Application 10 2005 058 415.2, filed on Dec. 7, 2005.

BACKGROUND OF THE INVENTION

1. Field of the Invention

This invention relates to a method for correcting color data during color data transmission from a pickup device to an output device.

2. The Prior Art

The above-mentioned method for color data correction has special importance in the context of digital image processing, since colored digital images are ordinarily transmitted from individual pickup devices to one or more display or output devices using red, green, and blue image points (RGB pixels). The same applies to digital moving pictures and digital films. In this connection, the intensities of red, green, and blue in each pixel are controlled to produce different colors in the sense of additive color mixing.

In display or printing technology, for example with monitors as display or output devices, the color mixing is achieved by individual small, differently colored dots lying so close to one another that their images are superimposed on the retina of a human eye by its limited resolution. Conventional pickup devices such as scanners or color CCD cameras often make use of three CCD chips with preceding color filters for color pickup, so that a separate CCD array is available for each of the three primary colors RGB (red, green, and blue).

However, video or digital cameras that operate with a single CCD sensor, which detects the individual colors using preceding strip filters or mosaic filters, are far more common since the individual pixels or image points of the CCD chip usually have no differentiating color sensitivities by themselves, but usually detect gray values and their intensity. In other words, the particular color information at this point is made available by an appropriately configured preceding color filter or a mosaic filter or strip filter.

The particular pickup devices that use CCD sensors, in the same way as display devices, for example monitors or printers, modify the colors transmitted to them equipment-specifically in each case. In other words, the color, not the color information, is changed, for example because of the particular phosphor used. The lighting of an object to be imaged also plays a role. While the maximum sensitivity of the human eye is in the green wavelength region at about 555 nm, semiconductor cameras, for example, are most sensitive in the near infrared region at wavelengths of about 700 nm to 800 nm. This is taken care of in practice by a rough color correction by providing that a suitable color filter matched to the sensitivity of the eye is placed ahead of the pickup device in question.

In addition to this, computational methods of image processing are used to allow corresponding filter functions to be represented digitally, or to make a color data correction. To provide for the most correct possible exchange of color data that is best adapted to human color perception and that best takes into account the relative color separations during color data transmission from the particular pickup device to the output device, a number of IT firms have agreed in the past on a common standardized color correction calculation that is prescribed by the authoritative "International Color Consortium" (ICC) (more detailed information in this regard can be found at the internet address www.color.org.).

A so-called standard color space is defined in the known color correction calculation. To obtain the standard color values to be used with it, it is necessary, for example, for the manufacturer to determine the specific color perception characteristics of a CCD camera as a pickup device, and to take them into proper consideration, and to include in the calculation the individual color reproduction characteristics of a monitor (of the phosphors) as the output device.

The standard color space mentioned is independent of the pickup device and of the output device, with only the input color data of the pickup device and the output color data for the output device undergoing a corresponding device-specific transformation. In this way, practically any desired pickup device can be combined with any desired output device, because there is always reference back to the conforming standard color space. The detected color data are subjected to a color correction calculation to become the standard color values of the standard color space, and these standard color values in turn are subjected to another color correction calculation to take into account the instrument specifications of the output device. This procedure has proved itself.

However, since the described ICC method or other method of calculation for color correction is always applied to all of the RGB color values and RGB color pixels of the associated pickup device, the processing rate is often slow. For example, a CCD chip with 1 million pixels as the pickup device consistently also obtains 1 million color pixels, which may contain only partial color information—corresponding to the particular front-end color filter—and are transformed into the 1 million color pixels only by the camera followed by interpolation. These color pixels are subjected to the color correction calculation according to the described ICC method. Because of this, it has not yet been possible to subject color data received by a pickup device directly to the described color correction calculation with consideration of a somewhat high resolution of the pickup device, and to output it to an associated output device with almost no delay. Actually, delays between pickup and reproduction have to be expected, which does not permit immediate observation on the specimen, for example, of cell motions or cell growth it the course of a simple search. Instead, it has been necessary up to now first to record a video with adequate imaging rate and then to interpret it. The invention is intended to be of assistance here.

SUMMARY OF THE INVENTION

It is therefore an object of the invention to provide a method for color data correction, with whose help the processing time is distinctly reduced so that there exists the ability to display color-corrected images practically without delay.

This object is accomplished according to the invention by a method for color data correction in the transmission of color data from a pickup device to an output device, by which raw data from the pickup device are converted to uncorrected interim color values with fewer pixels than the pickup device, and then the uncorrected interim color values are subjected to a color correction calculation, and are finally converted to corrected interim color values or target color values for the output device. These corrected interim color values and the target color values obtained from them by interpolation ordinarily have the number of pixels that corresponds to the original number of pixels.

The raw data are monochrome data, or gray value intensities with no color information. To equip the raw data with color information, the pickup device as a rule has a front-end color filter structure that prescribes a raw data structure. This color filter structure is advantageously a mosaic filter that assigns a color filter of its own, for example, to each individual pixel or image point of a CCD camera as the pickup device. Adjacent pixels or image points in each case have different color filters, for example red and green or green and blue, etc.; in other words the front-end filter or the color filter structure passes only a portion of the optical spectrum. Therefore it is not complete color information that is picked up, but only a portion of the existing color.

In this regard it has proved useful for a so-called Bayer structure to be used as the color filter structure, although naturally color filter structures completely different from a Bayer structure can also be used. It is characteristic of such a Bayer filter structure that four image pixels are combined in each case, whereby processing is done with two image points or pixels with front-end green filters on each, while the colors red and blue are each detected only once each. The Bayer filter or the Bayer structure of the color filter thereby takes into account the special green sensitivity of the human eye (for further information in this regard, see German Patent No. DE 102 23 751 A1 or International Application Publication No. WO 2005/032147 A1, each of which explains such Bayer filters).

Instead of a Bayer filter, a CMYG (cyan, magenta, yellow, and green) filter can also be used. In this case, the particular image point or pixel of the CCD camera, for example, collects only the information on a defined spectral interval prescribed by the front-end filters. This spectral interval is usually a section from the spectrum of the visible wavelength region, although the invention is naturally not limited thereto.

The raw data or monochromic raw data can be captured with various bit depths, without the processing time for the color data observed on the whole being significantly changed. For example, when working with 12-bit deep monochromic intensity data that may be converted to 8-bit or 16-bit, either individual bits are no longer taken into consideration, or additional (null) bits are entered. In any case, the raw data are converted to the uncorrected interim color values with consideration of their position in the raw data structure.

The color to which the associated intensity gray values correspond is determined from the position of the raw data in the raw data structure or in the raw data grid. The corresponding color is given by the color filter structure that determines the raw data structure. It has proved useful for every group of four adjacent raw data to be converted to a (single) uncorrected interim color value. Of course a different given number of raw data can also be processed in each case that are combined into the particular uncorrected interim color value in question. However, each uncorrected interim color value usually corresponds to a single Bayer structure, inasmuch as the raw data of an RGGB pixel group (four pixels, each with 12 bits, for example), are combined into an R', G', B' pixel with 24 bits or 48 bits. In these color pixels or uncorrected interim color values, R', G', B', for example, the first 8 bits correspond to the color red, the next 8 bits to the color green, and the last 8 bits to the color blue, if a 24-bit representation is chosen. On the other hand, if 48-bit interim color values are used, then each RGB color corresponds to 16 bits. It should be understood here that the previously 12-bit-deep raw data have first been converted to 8 bits or 16 bits ahead of time.

It is crucial for the uncorrected interim color values generated in such a way to have fewer pixels than the pickup device. Using the example of a CCD chip with 10×10 pixels, the number of pixels (with uncorrected interim color values) therefore then amounts to only one-fourth of the previous total of 100 image points and pixels of the pickup device, or 25 pixels. Since according to the invention the uncorrected interim color values, with distinctly fewer pixels (25%) than the pickup device, are subjected to the color correction calculation, the computation time likewise can be minimized to almost one-fourth, resulting in the ability to subject images detected by the pickup device to color correction and at the same time, with practically no delay, to display them on the output device. It is thus intended in the context of the invention for the color correction calculation to lead to no delay in data flow, or to negligible delay. Because of this, the images detected with the pickup device can be color-corrected and displayed at the same time on the output device in so-called "live" mode.

In this regard it is immaterial for the color correction calculation and the computation time needed, whether the raw data each have 8-bit or 16-bit depth per color statement, and consequently it is just as immaterial whether the interim color values carry a 24-bit or 48-bit statement. All that is necessary is the condition that the interim image composed of the uncorrected interim color values has available the distinctly reduced number of pixels compared to the pickup device. The ability resulting therefrom to fully utilize the speed of "live" mode is particularly important, for example, when living cell specimens are to be examined immediately in biology, and preceding time-consuming image processing and color correction routines would interfere and be drawbacks (for example, during surgery). Of course, the invention is expressly not limited to such fields of use.

It has proved useful for the raw data and/or the uncorrected interim color values to be subjected to supplementary correction algorithms, for example to image correction, before the color correction calculation. It is feasible here to perform a white balance. This can be carried out by defining a transparent and consequently "white" region of a sample as such, in which the associated R, G, and B color values assume the same value. This ordinarily corresponds to the color "gray," so that one can also speak of a gray balance here. In any event, the color of a (white light) source is defined as white by equalizing the R=G=B color values.

Beyond this, it is also feasible to perform an intensity correction of the (white light) source already addressed, on the raw data and/or uncorrected interim color values. For example, a shading correction is recommended, which compensates for any errors in the image illumination or uneven image illumination of an object photographed by transmission, or takes into account shadowing in the edge areas by the optical system, so-called "vignetting." To this end, a so-called gray value segmentation with automatic threshold setting is usually performed on the raw data, as described in detail in the book "Image Processing for Beginners," B. Neumann, Springer Verlag, 2004, pages 135 ff.

The corrected interim color values obtained in the end by the color correction of the uncorrected interim color values are rewritten into a prescribed data structure, which is advantageously the raw data grid or the raw data structure already addressed. In other words, the corrected interim color values with their R, G, and B color values are usually again rewritten, for example, into the Bayer structure. The corrected interim color values then undergo a change with regard to their number of pixels by interpolation between the individual R, G, and B color values in the raw data structure or the prescribed data structure, and in the end form the target color values. In most cases, this is done so that in conclusion, the number of pixels of the target color values corresponds to that of the pickup device. Basically, one can also work here with a different number of pixels.

The invention also relates to a device for color data correction during color data transmission from a pickup device to an output device.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a CCD chip as pickup device with front-end color mosaic filter;

FIG. 2 shows a section of FIG. 1 for determining interim color values;

FIG. 3 shows the object of FIG. 1 with the particular interim color values;

FIG. 4 shows a flow diagram of the method pursuant to the invention;

FIGS. 5a to 5d show the method of interpolation used on the target color values;

DETAILED DESCRIPTION OF THE PREFERRED EMBODIMENT

Figure 5A:
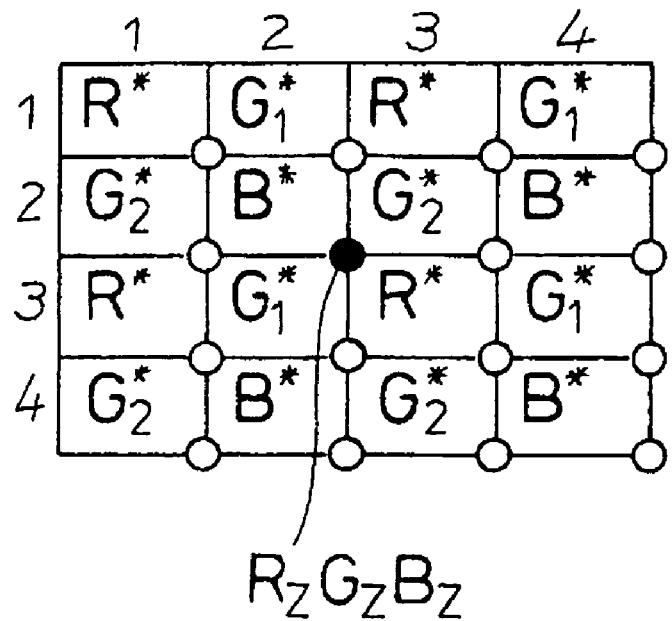
Figure 5B:
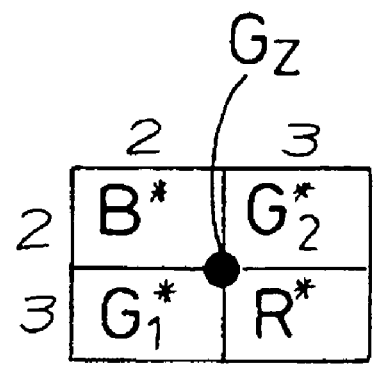

A method and a device for color data correction during color data transmission from a pickup device 1 to an output device 2 are described in the figures. For this purpose, raw data $RG_1G_2B$ are first recorded in the configuration of monochromic intensity gray values using pickup device 1 corresponding to FIG. 1. As seen in FIG. 1, pickup device 1 or image source 1 is a CCD chip with 10×10 or 100 pixels in this example, and a preceding in-line mosaic filter.

The mosaic filter is so constructed that adjacent image points, for example those of matrix positions 1 1 and 2 1, or 3 4 and 3 5, in each case have different front-end color filters. Thus, for the image point at position 1 1 only red fractions are passed, so that the corresponding image point carries a red statement R. The situation is comparable for the image points at positions 1 2 and 2 1, each of which passes green light G. The green region is then detected over two pixels or image points $G_1$ and $G_2$ in order to take into account the particular sensitivity of the human eye in the green spectral region. The pixel at position 2 2, finally, is responsible for the blue value B.

Figure 6:
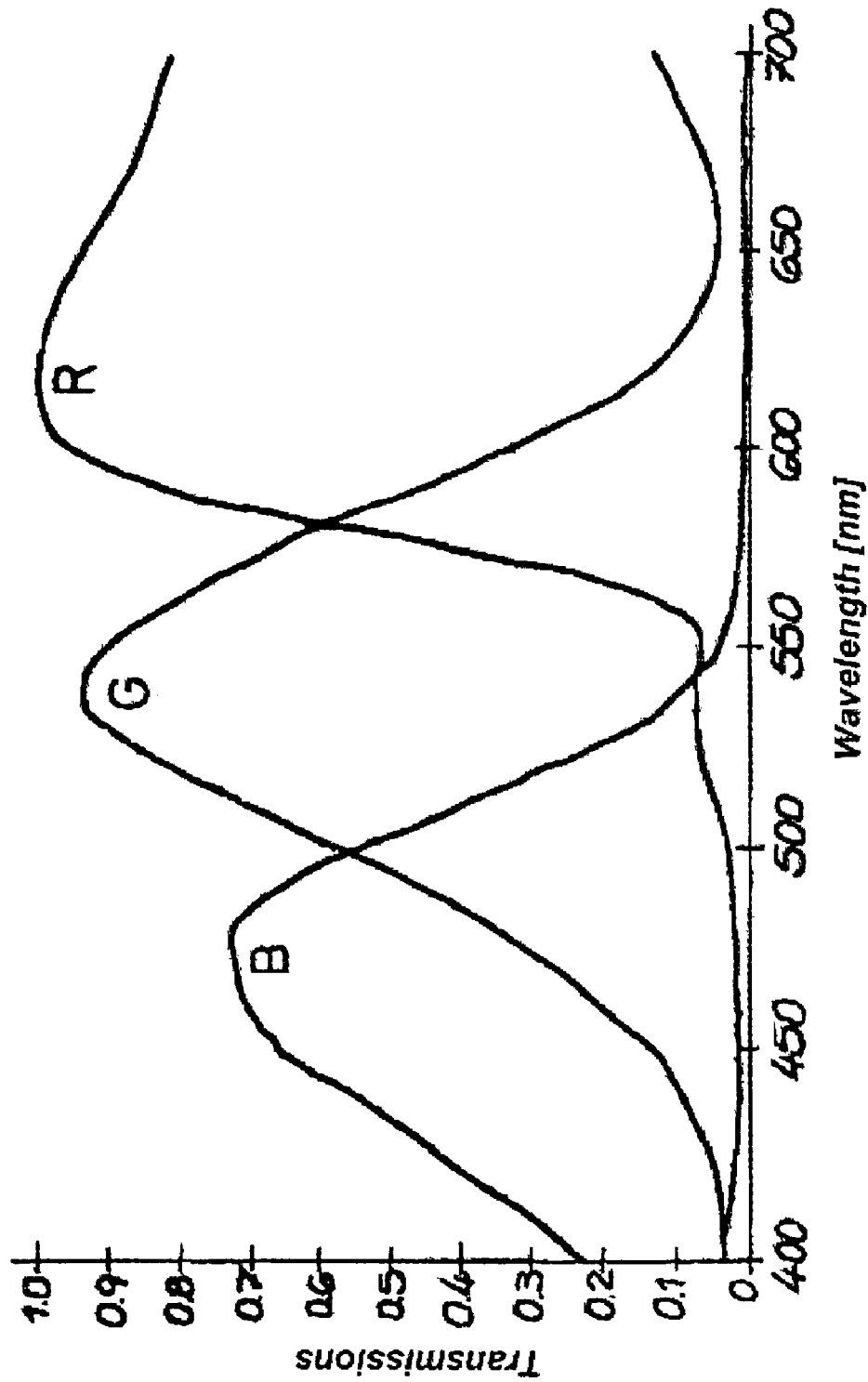
FIG. 6 shows a diagram of the transmission curves of FIG. 1.

It can be seen from FIG. 1 that the mosaic filter and the color filter structure resulting therefrom are made up of a periodic grid of four image points RGGB. This special color filter structure is a so-called Bayer structure and consequently the front-end mosaic filter is a Bayer filter. Because of the color filter structure, the monochromic raw data are given an associated raw data structure $RG_1G_2B$, since the intensity gray values read out at matrix position 1 1, for example, belong to the color red R, while on the other hand the position 2 2 corresponds to the color blue B. This is brought about in the context of the example of embodiment by providing the front-end color filter with transmission curves according to FIG. 6. Because of this, only a selective spectral region in the visible wavelength spectrum selected to correspond to the transparencies of the transmission curves reaches the pixel beyond the particular color filter in each case. It can be seen from FIG. 6 that the particular spectral regions RGB totally overlap, and cover the entire visible spectrum from about 400 nm to about 700 nm.

The raw data $RG_1G_2B$ read by the pickup device 1 are than converted to "uncorrected" interim color values R', G', B' (cf. FIGS. 2, 3, and 4). Before this, the raw data $RG_1G_2B$ are subjected to supplementary correction algorithms, for example for image correction. In the context of the embodiment shown, a so-called white balance is performed by equating the values for R, G, and B at transparent points of a translucent sample through which light is passed from a white light source, in other words R=G=B. The shading correction described earlier may also be carried out to take into consideration deviations of the white light source from overall homogeneous lighting.

Following these optional supplementary correction algorithms, the monochromic raw data $RG_1G_2B$ and the associated intensity gray values are converted to the "uncorrected" interim color values R', G', B' already discussed. To do this, each Bayer grid of the four image points $RG_1G_2B$ described previously is combined into an "uncorrected" interim color value or color pixel R', G', and B'. FIGS. 2 and 3 show this. It is seen here that the particular $RG_1G_2B$ block of pixels, the raw data, are converted into an "uncorrected" interim color value R', G', B' in which the two green pixels $G_1$ and $G_2$ are averaged according to $$G' = (G_1 + G_2)/2$$

and the red and blue values are both retained. A color pixel triplet, an uncorrected interim color value R', G', B', is generated for each four raw data pixels $RG_1G_2B$. This gives an interim image with a reduced number of pixels compared to the pickup device 1, whose pixels have the uncorrected interim color values R', G', B'. In fact, the number of pixels has been reduced from 100 for pickup device 1 in the example, to 25 color pixels for the uncorrected interim color values R', G', B', as FIG. 3 shows especially clearly.

The uncorrected interim color values R', G', B' of the interim image determined in such a way, with fewer pixels than pickup device 1, are then subjected to the color correction calculation, which is labeled CMM (Color Management Module) in FIG. 4. In other words the color correction calculation is performed in the example on only 25% of the pixels of pickup device 1, which provides the distinct processing rate benefit achieved pursuant to the invention, since the CMM calculation or ICC color correction calculation is comprehensive and tedious. It is practically immaterial here whether the monochromic raw data $RG_1G_2B$ then exist with 8, 12, or 16-bit color depth and as a consequence of that the uncorrected interim color values R', G', B' comprise 24 bits or 48 bits, for example. It should be pointed out that the ICC calculation as a color correction for the uncorrected interim color values R', G', B' represents only one example of a method, and naturally other procedures for color correction calculation are also included.

The uncorrected interim color values R', G', B' after the color correction calculation form corrected interim color values R*, G*, B*, which consequently represent color-corrected color pixel triplets. Their number corresponds (initially) to that of the uncorrected interim color values R', G', B' (cf. FIG. 4). Then to increase the number of pixels of the corrected interim color values R*, G*, B*, ideally again to 100 pixels in the example, or corresponding to the number of pixels of the pickup device 1, an interpolation process still to be described in detail is then carried out on the corrected interim color values R*, G*, B*.

For this purpose, the corrected interim color values R*, G*, B* obtained by color correction of the uncorrected interim color values R', G', B' are first rewritten into a prescribed data structure, in particular the raw data structure prescribed by the color filter structure corresponding to FIG. 1. This is indicated in FIGS. 4 and 5a. In other words, the color-corrected interim color values R*, G*, B* again assume their identical original position in the raw data grid and the raw data structure that is prescribed by the color filter and its color filter structure. Thus the corrected red value R* is located at position 1 1, while position 2 2 has the corrected blue value B*. Position 2 1 and 1 2, on the other hand, are each occupied by the same green values G*. This can be attributed to the previously performed averaging of the original green values $G_1$ and $G_2$ during conversion into the interim color values R', G', B'.

Now, in order to carry out the described averaging by interpolation and to modify the corrected interim values R*, G*, B* with respect to their number of pixels, the so-called "9331" interpolation method is used in the example, although other methods are naturally also feasible. The uncorrected interim values R', G', B' are available with a number N' of pixels, which is smaller than the number N of pixels of the pickup device 1, i.e. N'<N. This consequently also applies to the corrected interim color values R*, G*, B*, the number of which is also N'. At the conclusion of interpolation, the number of target color values $R_Z$, $G_Z$, $B_Z$ is again N and corresponds to that of the pickup device 1.

In the "9331" method of interpolation described in further detail in FIGS. 5a to 5d, virtual color pixels are calculated between four pixels each in the Bayer representation, specifically between four pixels each for each position. To do this, the green value of an interpolated target color value $G_Z$ is calculated by averaging with reference to FIG. 5b, specifically by the (different) green values at grid positions 3 2 and 2 3 undergoing averaging (cf. FIG. 5a). As a result of this, the green value $G_Z$ is available ($G_Z=(G^*_1+G^*_2)/2$).

For determining the red value according to FIG. 5c, the invention resorts to a weighting of the red values at positions 1 1, 3 1, 1 3, and 3 3 according to the following rule:

$$R_Z=(R^*_1+3\times(R^*_2+R^*_3)+9\times R^*_4)/16.$$

This is illustrated in FIG. 5c. Finally, the blue value determination is done according to the instructions in FIG. 5d, by the blue values at positions 2 2, 4 2, 2 4, and 4 4 undergoing weighting according to $$B=(9\times B^*_1+3\times(B^*_3+B^*_2)+B^*_4)/16.$$

As a result, an interpolated color value $R_Z$, $G_Z$, $B_Z$ is made available at the position extracted from FIG. 5a (solid circle). Interpolated target color values $R_Z$, $G_Z$, $B_Z$ are indicated in the same way for every other position (open circles in FIG. 5a). At the end of this procedure, the number of target color values $R_Z$, $G_Z$, $B_Z$ interpolated in this way is equal to the number N of pixels for pickup device 1. Of course, one could also work here with a different number of pixels for the interpolated target color values $R_Z$, $G_Z$, $B_Z$ if this were necessary.

Figure 7:
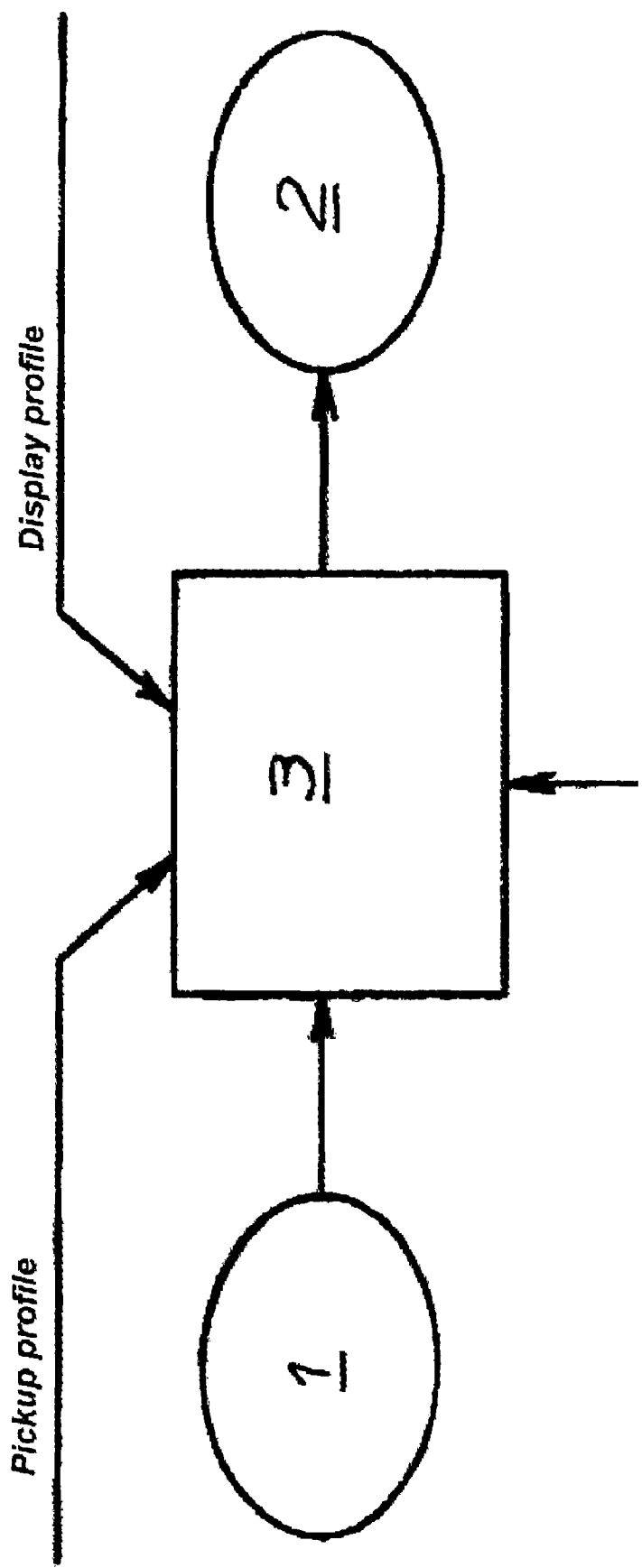
FIGS. 7 and 8 show an overview of the device pursuant to the invention.
Figure 8:
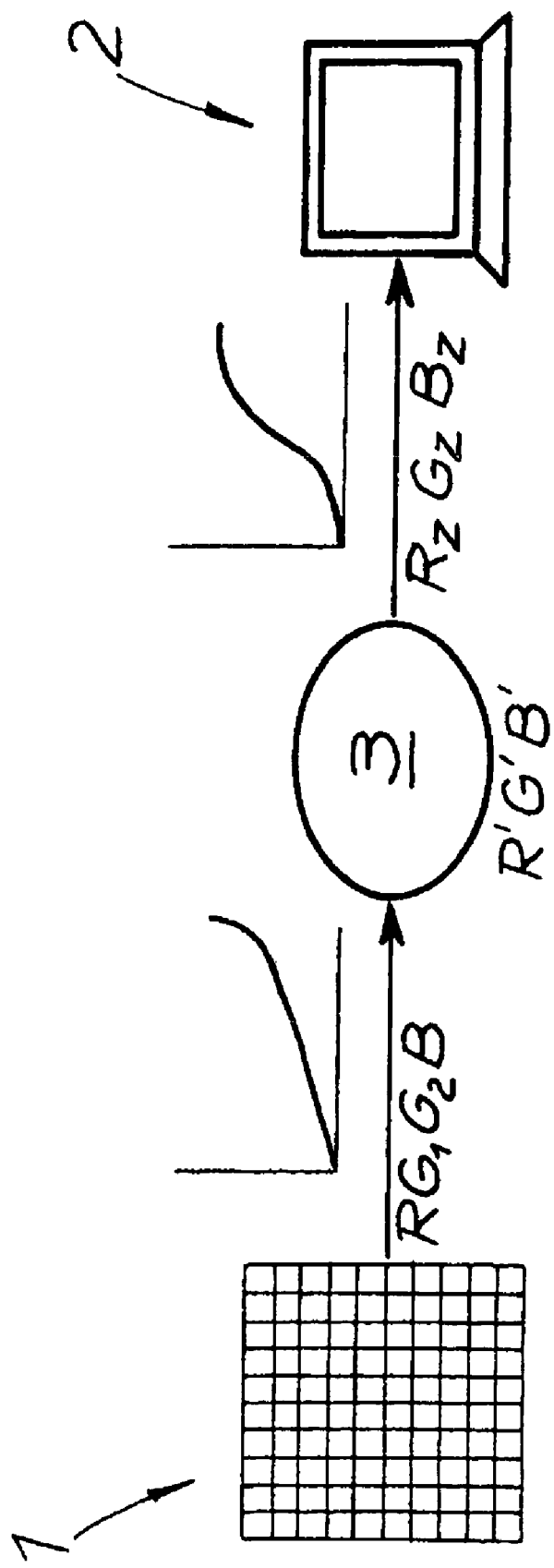

The fundamental procedure of the teaching of the invention is shown again in the overview in FIGS. 7 and 8. A control system 3 is connected between pickup device 1 and output device 2, which performs the color data correction or color correction calculation. A pickup profile of pickup device 1 and a display profile of output device 2 indicated in FIG. 8 are taken into consideration.

In detail, the monochromic raw data R, $G_1$, $G_2$, B are converted to uncorrected interim color values R', G', B' in the control system 3. These uncorrected interim color values R', G', B' are subjected to the color correction calculation with consideration of the pickup profile of pickup device 1, illustrated by a curve, and are finally converted to the corrected interim color values R*, G*, B*, which form the interpolated target color values $R_Z$, $G_Z$, $B_Z$ by interpolation, which at the same time take into account the display profile for output device 2.

Accordingly, while only a few embodiments of the present invention have been shown and described, it is obvious that many changes and modifications may be made thereunto without departing from the spirit and scope of the invention.

What is claimed is:

1. A method for color data correction during color data transmission from a pickup device to an output device, the pickup device having a front-end color filter structure that prescribes a raw data structure, comprising the following steps:
    converting raw pixel data of the pickup device to uncorrected interim color pixel values with a reduced number of pixels (N'<N) compared to the pickup device;
    subjecting the uncorrected interim color pixel values to a color correction calculation; and
    converting the uncorrected interim color pixel values to corrected interim color pixel values for the output device,
    wherein the corrected interim color pixel values obtained by color correction of the uncorrected interim color pixel values are written back into the raw data structure, and
    wherein every uncorrected interim color pixel values (R', G', B') corresponds to a single color filter structure in which the raw pixel data (R, $G_1$, $G_2$, B) of an RGGB pixel group are combined into a color pixel triplet (R', G', B') as an interim color pixel value (R', G', B') so that the two green pixels ($G_1$, $G_2$) of the raw pixel data (R, $G_1$, $G_2$, B) are averaged and the red and blue pixels are maintained for each pixel group.

2. A method according to claim 1, wherein the raw pixel data are converted to the uncorrected interim color pixel values with consideration of a position of the raw pixel data in a raw data structure.

3. A method according to claim 1, wherein the raw pixel data are monochromic.

4. A method according to claim 1, wherein the raw pixel data or the uncorrected interim color pixel values are subjected to image correction.

5. A method according to claim 1, wherein a number of pixels of interpolated target color values corresponds to the number of pixels of the pickup device.

6. A device for color data correction during color data transmission from a pickup device to an output device, the pickup device having a front-end color filter structure that prescribes a raw data structure, and with at least one image source being the pickup device, comprising:
    a control system that converts raw pixel data of the image source to uncorrected interim color pixel values with a smaller number of pixels than the pickup device, and subjects the uncorrected interim color pixel values to a color correction calculation and converts the uncorrected interim color pixel values into corrected interim color pixel values for the output device,
    wherein the control system writes back into the raw data structure the corrected interim color pixel values obtained by color correction of the uncorrected interim color pixel values, and wherein every uncorrected interim color pixel value (R', G', B') to a single color filter structure in which the raw pixel data (R, $G_1$, $G_2$, B) of an RGGB pixel group are combined into a color pixel triplet (R', G', B') as an interim color pixel value (R', G', B') so that the two green pixels ($G_1$, $G_2$) of the raw pixel data (R, $G_1$, $G_2$, B) are averaged and the red and blue pixels are maintained for each pixel group.

* * * * *